June 19, 1923.
M. SHUTOFF
ANIMAL TRAP
Filed Feb. 6, 1922
1,459,267
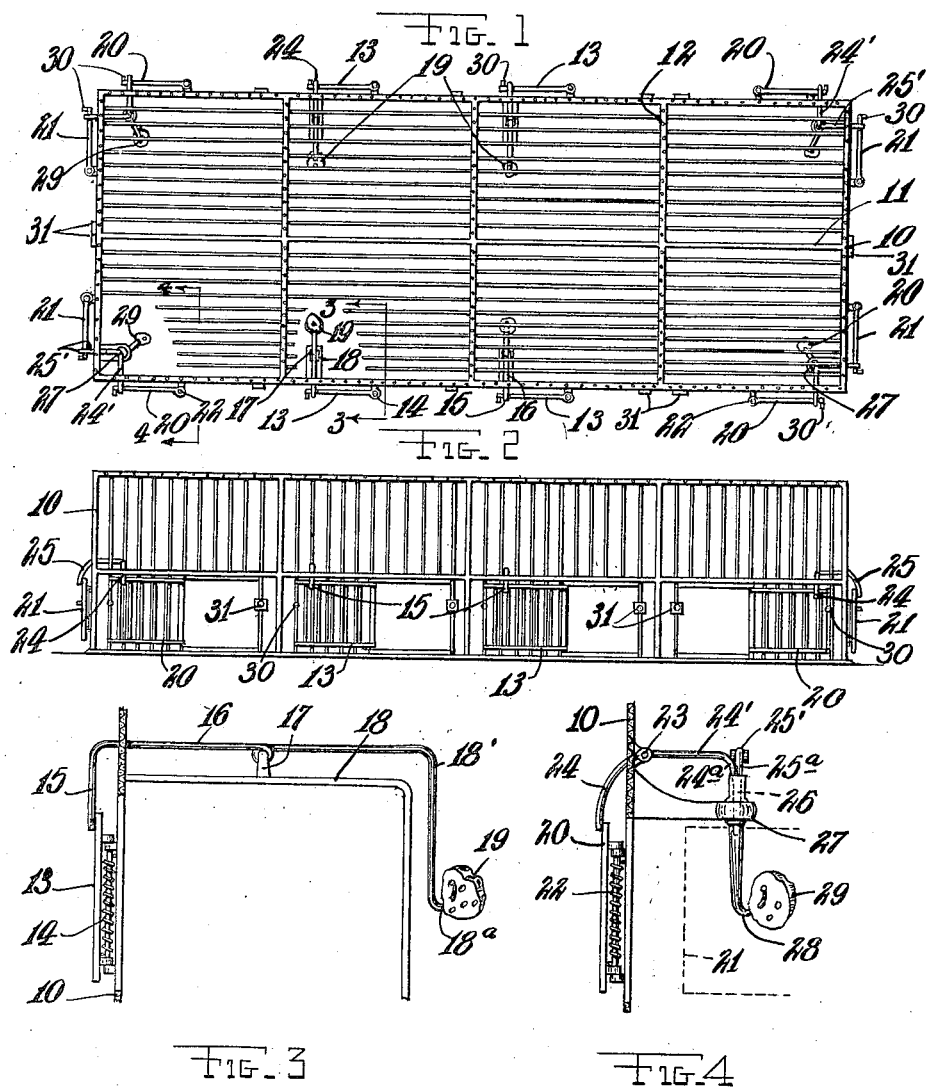
Inventor
Michael Shutoff
By Zoltan F. Polachek
Attorney Patented June 19, 1923.

1,459,267

UNITED STATES PATENT OFFICE.

MICHAEL SHUTOFF, OF FREEHOLD, NEW JERSEY.

ANIMAL TRAP.

Application filed February 6, 1922. Serial No. 534,268.

*To all whom it may concern:*

Be it known that I, MICHAEL SHUTOFF, citizen of the United States, residing at Freehold, in the county of Monmouth and State of New Jersey, have invented certain new and useful Improvements in Animal Traps, of which the following is a specification.

This invention relates to animal traps, having more particular reference to traps of the cage type.

The invention has for an object to provide a simple and efficient form of trap, and further to provide a multiple trap in which a number of animals may be caught.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of a trap constructed according to the invention.

Fig. 2 is a side view thereof.

Fig. 3 is an enlarged transverse section on the line 3—3 of Fig. 1, and illustrating particularly the trigger device of the single door compartments.

Fig. 4 is an enlarged fragmentary transverse section on the line 4—4 of Fig. 1, and illustrating the trigger device of the double door compartments.

As shown particularly in Figs. 1 and 2 my improved trap comprises a rectangular cage 10 divided by a central longitudinal partition 11 and a number of transverse partitions 12 into a plurality of separate compartments each functioning as an individual trap.

The intermediate compartments have hinged doors 13 in the sides thereof which are engaged by springs such as 14 which normally urge them to closed position. To hold these doors in open position I provide for each one thereof a device such as illustrated in Fig. 3 and consisting of a finger 15 projecting downward from a horizontal rod 16 pivoted between its ends on an eye 17 carried by a fixed support 18, this rod having a downturned arm 18' on its inner end formed with a hook 18ª which holds the bait 19. If the bait hook is pulled either downward, or laterally away from the adjacent wall, the arm is moved to free finger 15 from the door 13.

The end compartments of the trap have each a pair of doors, one on the side and one on the end, these doors being numbered 20 and 21 respectively, and being urged to closed position by springs such as 22. To hold these doors in open position I provide the device illustrated in Fig. 4 which comprises a pair of bell crank members pivoted in the compartments near the tops thereof as at 23 and having arms 24 and 25 respectively engaging the doors 20 and 21 to hold them open, the other arms 24' and 25' of these bell cranks having downturned tips 24ª and 25ª engaged by the upper end of a rod 26 which is mounted by a universal joint 27 at a point between its ends and has an upturned hook 28 on its lower end on which the bait 29 is placed.

As will be apparent, the pressure of the door springs 22 will hold the tips 24ª and 25ª against the rod 26, but if the bait 29 is pulled toward either door the rod will move out of engagement with the tips and release both doors together, which close under the influence of the springs 22, and their latches 30 engage in the usual snap locks 31.

While I have shown and described a preferred embodiment of my improved mouse trap it is understood that I do not limit myself to the precise construction herein disclosed, and the right is reserved to single traps and to all changes and modifications coming within the scope of the invention as defined in the appended claims.

Having thus described my invention what I claim as new and desire to protect by Letters Patent of the United States is as follows:

1. In a trap, a pair of separate doors, a rod having a bait holding device at one end, a ball and socket joint mounting for said rod between its ends, and door holding members adapted to press against the other end of said rod longitudinally of the latter.

2. In a trap, a pair of separate doors, a rod adapted to hold a bait, a universal joint mounting for said rod, and door holding members adapted to press against the end of said rod.

3. In a trap, a pair of separate doors, a rod adapted to hold a bait, a universal joint mounting for said rod, and door holding members adapted to press against the end of said rod, said door holding members comprising bell crank elements having one arm engaging a door and the other arm engaging the said rod.

4. In a trap, a pair of separate doors, a rod adapted to hold a bait, a universal joint mounting for said rod, and door holding members adapted to press against the end of said rod, said door holding members comprising bell crank elements having one arm engaging a door and the other arm engaging the said rod, and provided at their ends with tips aligning with and engaging with said rod.

In testimony whereof I have affixed my signature.

MICHAEL SHUTOFF.